(12) United States Patent
Umeda et al.

(10) Patent No.: US 8,053,385 B2
(45) Date of Patent: Nov. 8, 2011

(54) DIELECTRIC CERAMIC COMPOSITION AND ELECTRONIC COMPONENT

(75) Inventors: Yuji Umeda, Tokyo (JP); Fan Zhang, Xiamen (CN)

(73) Assignee: TDK Corporation, Tokyo (JP)

( * ) Notice: Subject to any disclaimer, the term of this patent is extended or adjusted under 35 U.S.C. 154(b) by 124 days.

(21) Appl. No.: 12/699,427

(22) Filed: Feb. 3, 2010

(65) Prior Publication Data

US 2010/0204034 A1 Aug. 12, 2010

(30) Foreign Application Priority Data

Feb. 9, 2009 (JP) ................. 2009-027506

(51) Int. Cl.
*C04B 35/468* (2006.01)
*C04B 35/47* (2006.01)

(52) U.S. Cl. ..................................... 501/139

(58) Field of Classification Search .......... 501/139
See application file for complete search history.

(56) References Cited

U.S. PATENT DOCUMENTS

| 6,429,163 | B2 * | 8/2002 | Kim et al. | 501/137 |
| 6,451,721 | B2 * | 9/2002 | Kawabata et al. | 501/135 |
| 7,022,635 | B2 * | 4/2006 | Wang et al. | 501/138 |
| 7,528,088 | B2 * | 5/2009 | Umeda et al. | 501/139 |

FOREIGN PATENT DOCUMENTS

| JP | A-2003-238240 | 8/2003 |
| JP | B2-3767377 | 4/2006 |

* cited by examiner

*Primary Examiner* — Karl Group
(74) *Attorney, Agent, or Firm* — Oliff & Berridge, PLC

(57) ABSTRACT

The dielectric ceramic composition comprising a main component including a compound satisfying a compositional formula of $(Sr_xBa_{1-x})_mTiO_3$ ("x" in said compositional formula is $0.159 \leq$ "x" $\leq 0.238$, and "m" is $0.997 \leq$ "m" $\leq 1.011$), and a subcomponent comprising 11 to 25 weight % of $CaTiO_3$, 0.10 to 0.50 weight % of at least one oxide of element selected from the group consisting of Fe, Co, Ni, Cu, and Zn in terms of $FeO_{3/2}$, $CoO_{4/3}$, NiO, CuO, and ZnO, 0.590 to 1.940 mol % of an oxide of element "A" (A is Mn and/or Cr), and an oxide of element "D" where "D" is at least one element selected from a group consisting of La, Ce, Pr, Nd, Sm, Eu, Gd, Tb, Dy, Ho, and Y; wherein a ratio (A/D) of the element "A" with respect to element "D" is 2.250 to 7.450. According to the present invention, the dielectric loss (tan δ) at the wide frequency range can be lowered while maintaining a good capacitance temperature characteristic and the specific permittivity, without including Pb and bismuth Bi.

3 Claims, 1 Drawing Sheet

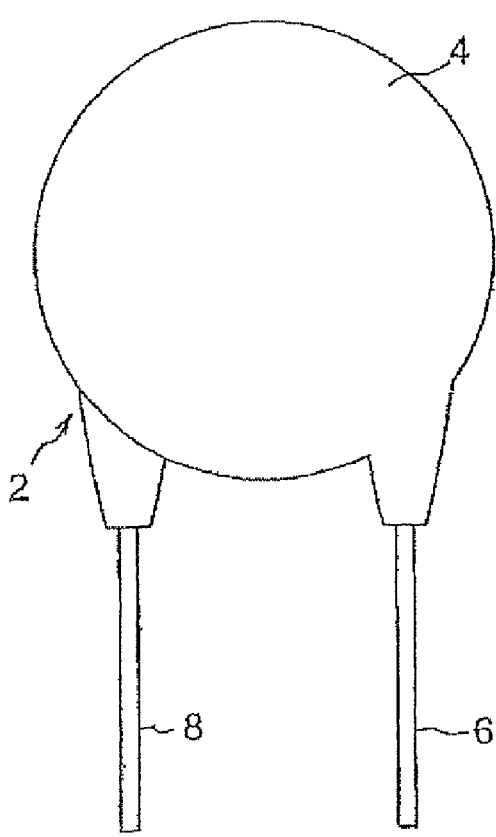
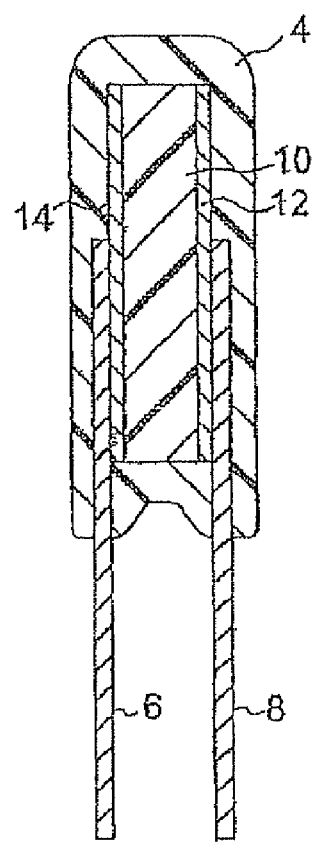

DIELECTRIC CERAMIC COMPOSITION AND ELECTRONIC COMPONENT

BACKGROUND OF THE INVENTION

1. Field of the Invention

The present invention relates to a dielectric ceramic composition used for a dielectric layer or so of an electronic component. Further specifically, the present invention relates to the dielectric ceramic composition and the electronic component using thereof which can lower a dielectric loss in a wide frequency range without including a lead (Pb) which is an environmental harmful material and bismuth (Bi) which the resource price is rising. Also the present invention relates to the dielectric ceramic composition and the electronic component using thereof having a relatively high dielectric constant while having a relatively good temperature characteristic, and also provides at lower cost.

2. Description of the Related Art

Recently, an environmental protection movement in a global scale has become more active, and thus in the electronic component field, it is demanded to reduce an environmental harmful material such as lead (Pb) or so. Therefore, there is a need for a development of an dielectric ceramic composition without a lead (Pb) but having characteristics at same level or better compared to one with a lead.

Also, since an electronic circuit constituting the electronic device has downsized and are more complicated, the electronic component mounted in the electronic circuit is demanded to be even more downsized and to have little self-heating to prevent a malfunction. Thus, even for a ceramic capacitor as one example of the electronic component, it is demanded to maintain a good temperature characteristic while having a high dielectric constant in order for the downsizing, and furthermore to have low dielectric loss in order to lower the self-heating.

On the other hand, due to the rising of the resource price, the manufacturing cost of the electronic component including a rare earth has also increased, however since a great deal of an amount of the electronic components are used in the electronic device, it is demanded to lower the price while maintaining a good ability.

Particularly, bismuth (Bi) is one of the rare earth that the price has recently increased, and it has been a problem for lowering the price of the electronic component. Also, bismuth (Bi) easily evaporates during a firing, and has been causing the characteristics to vary and to deteriorate the furnace material in the firing furnace.

Thus, the dielectric ceramic composition which does not include lead and also bismuth is demanded in order to obtain the electronic component having the high characteristics while satisfying the environmental protection and lowering the price.

For example, Japanese Patent No. 3767377 discloses the dielectric ceramic composition having a small dielectric loss within the high frequency range and also having good temperature characteristics. However, this dielectric ceramic composition includes lead and thus did not satisfy the demand of the environmental protection.

As the dielectric ceramic composition which does not include lead, for example Japanese Patent Application 2003-238240 discloses the dielectric ceramic composition obtained by adding at least one element among La, Nd, Ce, Sn, Zr, Ta, and Nb to a main component consisting of $BaCO_3$, $Bi_2O_3$, and $TiO_2$. However, the best dielectric loss of this dielectric ceramic composition shown at 1 MHz is 0.1 (10%) or so which is considered high; hence the self-heating was not sufficiently suppressed. Therefore, this dielectric ceramic composition could not effectively correspond to the demand for downsizing and complicating the electronic circuit for a raid-high voltage.

Furthermore, this dielectric ceramic composition includes bismuth, thus did not correspond to the demand of lowering the cost.

SUMMARY OF THE INVENTION

The present invention has been achieved reflecting above described situation, and the objective is to reliably provide a dielectric ceramic composition which does not include lead (Pb) and bismuth (Bi), while lowering the dielectric loss in the wide frequency range, and also having a good capacitance temperature characteristic and a specific permittivity. Also, the objective of the present invention is to provide an electronic component obtained by using such dielectric ceramic composition.

As a result of a keen examination to accomplish the above objective, the present inventors have found that the above objective can be accomplish by making the composition of the dielectric ceramic composition to a specific component, and by making the ratio thereof to a predetermined range; thereby the present invention was accomplished.

That is, the dielectric ceramic composition of the present invention comprises a main component including a compound satisfying a compositional formula of $(Sr_xBa_{1-x})_mTiO_3$ wherein said compositional formula "x" is $0.159 \leq "x" \leq 0.238$, and "m" is $0.997 \leq "m" \leq 1.011$, and a subcomponent comprising $CaTiO_3$, at least one oxide of element selected from a group consisting of Fe, Co, Ni, Cu and Zn, an oxide of element "A" where "A" is at least one element selected from a group consisting of Mn and Cr, and an oxide of element "D" where "D" is at least one element selected from a group consisting of La, Ce, Pr, Nd, Sm, Eu, Gd, Tb, Dy, Ho, and Y; wherein with respect to 100 weight % of said main component,
$CaTiO_3$ is 11 to 25 weight %, and
at least one oxide of element selected from the group consisting of Fe, Co, Ni, Cu, and Zn in terms of $FeO_{3/2}$, $CoO_{4/3}$, NiO, CuO, and ZnO is 0.10 to 0.50 weight %; and
with respect to 100 mol % of said main component,
the oxide of element "A" in terms of Mn element and Cr element is 0.590 to 1.940 mol %, and a ratio (A/D) of the element "A" with respect to element "D" in terms of molar ratio is 2.250 to 7.450.

The dielectric ceramic composition according to the present invention does not include lead (Pb) and bismuth (Bi). However, even without including lead and bismuth, by making the main component and the subcomponent to the above described composition and amount, thereby the dielectric ceramic composition having a little dielectric loss can be obtained in the wide frequency range while maintaining the specific permittivity and the temperature characteristic.

According to the present invention, the electronic component comprising the dielectric layer constituted by the above described dielectric ceramic composition is provided. The electronic component according to the present invention is not particularly limited; however, a mid-high voltage capacitor used, for example, in snubber circuit may be mentioned.

According to the present invention, a power unit comprising the above described electronic component is provided. As for the power unit according to the present invention, for example, the power unit comprising the snubber circuit may be mentioned. The power unit according to the present invention has a little heating since it comprises the above electronic component.

In the dielectric ceramic composition of the present invention, the above described components are the main component and the subcomponent, and the ratio of each component is in the above described predetermined range, furthermore, lead (Pb) and bismuth (Bi) are not included. As a result, the harm towards the environment can be reduced, while making the dielectric loss low in the wide frequency range, and furthermore the dielectric ceramic composition having a good temperature capacitance characteristics and a high specific permittivity can be obtained at low cost.

By using such dielectric ceramic composition of the present invention to the dielectric layer of the electronic components such as ceramic capacitor or so, the dielectric loss can lowered without including lead (Pb) and bismuth (Bi), and furthermore the electronic component having good capacitance temperature characteristic and the specific permittivity can be provided. Therefore, the power unit comprising the electronic component of the present invention can accomplish the low heating.

BRIEF DESCRIPTION OF THE DRAWINGS

FIG. 1A is a front view of a ceramic capacitor according to an embodiment of the present invention.

FIG. 1B is the Side Cross Section View of the Ceramic Capacitor According to an embodiment of the present invention.

DETAILED DESCRIPTION OF THE INVENTION

Hereinafter, the present invention will be described based on the embodiment shown in the figure.
Ceramic Capacitor 2

As shown in FIG. 1A and FIG. 1B, the ceramic capacitor 2 according to the present embodiment comprises a dielectric layer 10, a pair of terminal electrodes 12 and 14 formed at the surfaces of the dielectric layer 10 facing each other, and a lead terminals 6 and 8 connected to the terminal electrodes 12 and 14 respectively; and are covered by a protective resin 4. The form of the ceramic capacitor 2 may be determined in accordance with the purpose and the use; however preferably the capacitor is a circular plate form having the dielectric layer 10 formed in a circular plate. Also the size may be determined depending on the purpose and the use, however the diameter is 5 to 20 mm or so and preferably 5 to 15 mm or so.
Dielectric Layer 10

The dielectric layer 10 comprises the dielectric ceramic composition of the present invention. The dielectric ceramic composition of the present invention does not substantially include lead (Pb) and bismuth (Bi); and comprises a main component including the compound shown by a compositional formula of $(Sr_xBa_{1-x})_mTiO_3$ and a subcomponent comprising $CaTiO_3$, at least one oxide of element selected from a group consisting of Fe, Co, Ni, Cu and Zn, an oxide of element "A" where "A" is at least one element selected from a group consisting of Mn and Cr, and an oxide of element "D" where "D" is at least one element selected from a group consisting of La, Ce, Pr, Nd, Sm, Eu, Gd, Tb, Dy, Ho, and Y.

The dielectric ceramic composition of the present invention, as mentioned in the above, does not substantially include lead (Pb) and bismuth (Bi) from the point of view of the environment and the resource price. "does not substantially include" means that lead (Pb) and bismuth (Bi) may be included in the dielectric ceramic composition of the present invention if the amount is about the impurity level. For example, the impurity level is 300 ppm or less.

Also, in the compound shown by the compositional formula of $(Sr_xBa_{1-x})_mTiO_3$ included in the main component, "x" in said compositional formula is $0.159 \leq$ "x" $\leq 0.240$, Preferably $0.170 \leq$ "x" $\leq 0.233$, and more preferably $0.175 \leq$ "x" $\leq 0.220$.

"x" shows the ratio of Sr, and when "x" is too small, a "∈max" which shows the maximum value of a capacitance changing rate at a predetermined temperature range becomes too large, and the predetermined capacitance temperature characteristic tends to fail to satisfy. When "x" is too large, the capacitance temperature characteristic tends to deteriorate.

Also, "m" in the above compositional formula is $0.997 \leq$ "m" $\leq 1.011$, and preferably $0.999 \leq$ "m" $\leq 1.008$.

"m" shows the molar ratio between Sr and Ba, and Ti. When "m" is too small, the dielectric loss tends to deteriorate. When "m" is too large, "∈max" becomes too large, hence the predetermined capacitance temperature characteristic tends to fail to satisfy.

The dielectric ceramic composition of the present invention comprises the oxide of element "A", the oxide of element "D", at least one oxide of element selected from a group consisting of Fe, Co, Ni, Cu and Zn, and $CaTiO_3$.

The oxide of element "A" has an effect to improve the insulation resistance. The element "A" (Acceptor) is at least one element selected from a group consisting of Mn and Cr, and preferably it is Mn. With respect to 100 mol % of the main component, the amount of the above mentioned oxide in terms of MnO and $CrO_{3/2}$ is 0.590 to 1.940 mol %, preferably 0.779 to 1.753 mol %, and more preferably 0.876 to 1.460 mol %. If the amount is too little, the capacitance temperature characteristic tends to deteriorate. On the other hand, when the amount is too much, the dielectric loss and "∈max" tends to deteriorate.

Note that, for example, when the dielectric composition comprise the oxide of Mn; MnO or $MnCO_3$ may be used as the material. In the dielectric ceramic composition after a firing, it will be included as MnO.

The oxide of element "D" has an effect to reduce the dielectric loss. The element "D" (Donor) is at least one element selected from a group consisting of La, Ce, Pr, Nd, Sm, Eu, Gd, Tb, Dy, Ho, and Y, and preferably Ce, La, Pr, Nd, and Sm, and more preferably Ce, La, and Pr.

In the present invention, the ratio between the above mentioned element "A" and element "D" (A/D) is, in molar ratio, 2.250 to 7.450, and preferably 2.990 to 6.740. By controlling A/D within the above mentioned range, a desired capacitance temperature characteristic can be satisfied while maintaining a good specific permittivity and dielectric loss. When A/D is too small, the capacitance temperature characteristic tends to deteriorate. On the other hand, when too large, the dielectric loss and "∈max" tend to deteriorate.

At least one oxide of element selected from a group consisting of Fe, Co, Ni, Cu and Zn has an effect to improve the capacitance temperature characteristic and to improve the sinterability. Preferably, it is the oxide of Zn, Fe, or Ni, and particularly preferably it is the oxide of Zn. With respect to 100 weight % of the main component, the amount of the above mentioned oxide in terms of $FeO_{3/2}$, $CoO_{4/3}$, NiO, CuO, and ZnO is 0.10 to 0.50 weight %, preferably 0.15 to 0.50 weight %, and more preferably 0.20 to 0.45 weight %. When the amounts of these oxides are too little, the dielectric loss tends to deteriorate. On the other hand, when the amounts of these oxides are too large, the specific permittivity tends to be greatly reduced.

$CaTiO_3$ has an effect to flatten the temperature change of the specific permittivity. With respect to 100 weight % of the main component, the amount of $CaTiO_3$ is 11 to 25 weight %, preferably 11 to 20 weight %, and more preferably 12 to 17 weight %. When the amount of $CaTiO_3$ is too little, the dielectric loss tends to deteriorate, and "∈max" tends to become too large, hence the desired capacitance temperature characteristic tends to fail to be satisfied. When the amount of $CaTiO_3$ is too large, the specific permittivity tends to decline.

The thickness of the dielectric layer 10 is not particularly limited and can be determined depending on the use or so; however, it is preferably 0.3 to 2 mm. By making the thickness of the dielectric layer 10 within such range, it can be suitably used for the mid-high voltage.

Terminal Electrodes 12 and 14

The terminal electrodes 12 and 14 are constituted from conductive materials. The conductive materials used for the terminal electrodes 12 and 14 include, for example, Cu, Cu alloy, Ag, Ag alloy, In—Ga alloy or so as a main component. Also, the terminal electrodes 12 and 14 may be a single layer structure of such metals or alloy, or may be multi layer structure.

Manufacturing Method of the Ceramic Capacitor

Next, the manufacturing method of the ceramic capacitor according to the present embodiment will be described. First, the dielectric ceramic composition powder is manufactured which forms the dielectric layer 10 shown in FIG. 1 after firing.

First, the material of the main component and the material of the subcomponent are prepared. As for the material of the main component, each oxide of Sr, Ba, and Ti, and/or the material which becomes the oxide thereof by firing, or the composite oxide thereof may be mentioned; and for example, a carbonate such as $SrCO_3$ and $BaCO_3$, the oxide such $TiO_2$ can be used. Also, the material of the main component may be manufactured by solid phase method, or by liquid phase method such as an oxalate method or hydrothermal synthesis method. However, from the point of the manufacturing cost, preferably the solid phase method is used.

As for the material of the subcomponent, it is not particularly limited, the oxide or composite oxide of each subcomponent described in the above, or a various compounds which becomes the oxide or composite oxide thereof by firing may be mentioned, and for example, it may be suitably selected from carbonate, nitrate, hydroxide, or organo-metallic compound for use.

Next, the materials of the main component are weighed to have a predetermined composition as described in the above, and wet-mixed by using a ball-mill or so. Then the obtained mixture is granulated and compacted. By calcining the obtained compacted powder under the air atmosphere, the calcine powder of the material of the main component is obtained. Next, the obtained calcine powder is roughly pulverized and further wet mixed to obtain the dielectric ceramic composition powder. As for the condition of the calcine, for example, the calcine temperature is preferably 900 to 1200° C., and the calcine time is preferably 0.5 to 4 hours. Note that, the dielectric ceramic composition powder can be obtained by calcining the material of the main component and the material of the subcomponent under the same condition; or the dielectric ceramic composition powder can be obtained by mixing the material of the main component and the material of the subcomponent after calcining under the different condition. As described in above, by manufacturing the dielectric ceramic composition using the solid phase method, the manufacturing cost can be lowered while achieving the desired characteristics.

Next, the obtained dielectric ceramic composition powder is granulated using the binder or so, and the obtained granulates are molded into a disk form having a predetermined size to form a green molding. Then by firing the obtained green molding, the sintered body of the dielectric ceramic composition is obtained. Note that, the condition of the firing is not particularly limited; however, the holding temperature is preferably 1100 to 1400° C., more preferably 1150 to 1350° C., and the firing atmosphere is preferably air.

Next the terminal electrodes are printed, and by baking if necessary, to the main surface of the sintered body of the obtained dielectric ceramic composition to form the terminal electrodes 12 and 14. Then, the lead terminals 6 and 8 are connected to the terminal electrodes 12 and 14 by soldering, Finally, by covering the element body by the protective resin 4, a single plate ceramic capacitor as shown in FIG. 1A and FIG. 1B is obtained.

The ceramic capacitor of the present invention manufactured as such is incorporated, through the lead terminals 6 and 8, for example, to the snubber circuit of the switching power unit to obtain the power unit of the present invention.

Hereinabove, the embodiment of the present invention was described, however the present invention is not limited to such embodiment, and the present invention can be attained in various different embodiment without exceeding the scope of the invention.

For example, in the above described embodiment, the single plate ceramic capacitor was mentioned as an example of the electronic component according to the present invention, however the present invention is not limited thereto, and it may be a multilayer ceramic capacitor manufactured by an usual method of printing method or sheet method using the dielectric paste including the above described dielectric ceramic compositions and the electrode paste.

EXAMPLES

Hereinafter, the present invention is described based on the further detailed example; however the present invention is not limited thereto.

Example

First, as for a main component material, $SrCO_3$, $BaCO_3$, and $TiO_2$ were prepared respectively. Further, as for a subcomponent material, $CaTiO_3$, an oxide or carbonate of an element "A" ($MnCO_3$, $Cr_2O_3$), CuO, $Fe_2O_3$, $CO_3O_4$, NiO, ZnO, an oxide of element "D" where "D" is La, Ce, Pr, Nd, Sm, Eta, Gd, Tb, Dy, Ho, and Y, were prepared. Note that, $CaTiO_3$ were manufactured as follows. The $CaCO_3$ material and $TiO_2$ material were wet-mixed, and the material being dried were calcined under air at 1000° C. for 2 hours. The calcined material was further wet-mixed to obtain $CaTiO_3$.

Next, the materials of the main component were weighed so that those satisfy the composition shown in Table 1; and wet-mixed by ball-mill using water as a solvent. Then, after drying the obtained mixture, it was granulated by adding 5 wt % of water to compact. Then the obtained compacted powder was calcined at 1150° C. for 2 hours under air. The calcined powdered body was roughly pulverized by a grinder; and further the materials of the subcomponent were weighed and added to the calcined powder for wet-pulverizing so that those satisfy each composition shown in Table 1. By drying the mixture, the dielectric ceramic composition powder having each composition shown in Table 1 (each composition of samples No. 1 to 43) were obtained. Note that, $MnCO_3$ will be included in the dielectric ceramic composition as MnO, after the firing.

TABLE 1

| | Main component $(Sr_xBa_{1-x})_mTiO_3$ (wt. %) | | | Subcomponent | | | | | | CaTiO₃ |
|---|---|---|---|---|---|---|---|---|---|---|
| | | | | D element | | A element | | | Fe, Co, Ni, Cu, Zn | |
| Sample No. | x (at. %) | 1 − x (at. %) | m | Type | Amount (mol %) | Type | Amount (mol %) | A/D | Type | Amount (wt. %) | Amount (wt. %) |
| *1 | 0.158 | 0.842 | 1.002 | CeO₂ | 0.262 | MnCO₃ | 1.276 | 4.866 | ZnO | 0.35 | 15 |
| 2 | 0.170 | 0.830 | 1.002 | CeO₂ | 0.261 | MnCO₃ | 1.273 | 4.886 | ZnO | 0.35 | 15 |
| 2a | 0.175 | 0.825 | 1.002 | CeO₂ | 0.261 | MnCO₃ | 1.273 | 4.886 | ZnO | 0.35 | 15 |
| 3 | 0.182 | 0.818 | 1.002 | CeO₂ | 0.261 | MnCO₃ | 1.269 | 4.866 | ZnO | 0.35 | 15 |
| 4 | 0.193 | 0.807 | 1.002 | CeO₂ | 0.260 | MnCO₃ | 1.168 | 4.492 | ZnO | 0.35 | 15 |
| 5 | 0.206 | 0.794 | 1.002 | CeO₂ | 0.259 | MnCO₃ | 1.165 | 4.492 | ZnO | 0.35 | 15 |
| 6 | 0.220 | 0.780 | 1.002 | CeO₂ | 0.259 | MnCO₃ | 1.161 | 4.492 | ZnO | 0.35 | 15 |
| 7 | 0.233 | 0.767 | 1.001 | CeO₂ | 0.258 | MnCO₃ | 1.158 | 4.492 | ZnO | 0.35 | 15 |
| *8 | 0.239 | 0.761 | 1.001 | CeO₂ | 0.257 | MnCO₃ | 1.156 | 4.492 | ZnO | 0.35 | 14 |
| *9 | 0.193 | 0.807 | 0.996 | CeO₂ | 0.259 | MnCO₃ | 1.164 | 4.492 | ZnO | 0.35 | 15 |
| 10 | 0.193 | 0.807 | 0.999 | CeO₂ | 0.260 | MnCO₃ | 1.166 | 4.492 | ZnO | 0.35 | 15 |
| 11 | 0.193 | 0.807 | 1.004 | CeO₂ | 0.260 | MnCO₃ | 1.170 | 4.492 | ZnO | 0.35 | 15 |
| 12 | 0.193 | 0.807 | 1.008 | CeO₂ | 0.261 | MnCO₃ | 1.173 | 4.492 | ZnO | 0.35 | 15 |
| *13 | 0.193 | 0.807 | 1.012 | CeO₂ | 0.262 | MnCO₃ | 1.176 | 4.492 | ZnO | 0.35 | 15 |
| *14 | 0.193 | 0.807 | 1.002 | CeO₂ | 0.260 | MnCO₃ | 0.584 | 2.246 | ZnO | 0.35 | 15 |
| 15 | 0.193 | 0.807 | 1.002 | CeO₂ | 0.260 | MnCO₃ | 0.779 | 2.995 | ZnO | 0.35 | 15 |
| 15a | 0.193 | 0.807 | 1.002 | CeO₂ | 0.260 | MnCO₃ | 0.876 | 3.369 | ZnO | 0.35 | 15 |
| 16 | 0.193 | 0.807 | 1.002 | CeO₂ | 0.195 | MnCO₃ | 1.363 | 6.988 | ZnO | 0.35 | 15 |
| 16a | 0.193 | 0.807 | 1.002 | CeO₂ | 0.260 | MnCO₃ | 1.460 | 5.615 | ZnO | 0.35 | 15 |
| 17 | 0.193 | 0.807 | 1.002 | CeO₂ | 0.260 | MnCO₃ | 1.753 | 6.738 | ZnO | 0.35 | 15 |
| *18 | 0.193 | 0.807 | 1.002 | CeO₂ | 0.260 | MnCO₃ | 1.947 | 7.487 | ZnO | 0.35 | 15 |
| *19 | 0.193 | 0.807 | 1.002 | CeO₂ | 0.260 | MnCO₃ | 1.168 | 4.492 | ZnO | 0.05 | 15 |
| 20 | 0.193 | 0.807 | 1.002 | CeO₂ | 0.260 | MnCO₃ | 1.168 | 4.492 | ZnO | 0.15 | 15 |
| 20a | 0.193 | 0.807 | 1.002 | CeO₂ | 0.260 | MnCO₃ | 1.168 | 4.492 | ZnO | 0.2 | 15 |
| 21 | 0.193 | 0.807 | 1.002 | CeO₂ | 0.260 | MnCO₃ | 1.168 | 4.492 | ZnO | 0.45 | 15 |
| 21a | 0.193 | 0.807 | 1.002 | CeO₂ | 0.260 | MnCO₃ | 1.168 | 4.492 | ZnO | 0.5 | 15 |
| *22 | 0.193 | 0.807 | 1.002 | CeO₂ | 0.260 | MnCO₃ | 1.168 | 4.492 | ZnO | 0.55 | 15 |
| *23 | 0.182 | 0.818 | 1.002 | CeO₂ | 0.261 | MnCO₃ | 1.269 | 4.866 | ZnO | 0.35 | 10 |
| 24 | 0.182 | 0.818 | 1.002 | CeO₂ | 0.261 | MnCO₃ | 1.269 | 4.866 | ZnO | 0.35 | 11 |
| 24a | 0.182 | 0.818 | 1.002 | CeO₂ | 0.261 | MnCO₃ | 1.269 | 4.866 | ZnO | 0.35 | 12 |
| 25 | 0.182 | 0.818 | 1.002 | CeO₂ | 0.261 | MnCO₃ | 1.269 | 4.866 | ZnO | 0.35 | 13 |
| 25a | 0.182 | 0.818 | 1.002 | CeO₂ | 0.261 | MnCO₃ | 1.269 | 4.866 | ZnO | 0.35 | 17 |
| 26 | 0.193 | 0.807 | 1.002 | CeO₂ | 0.260 | MnCO₃ | 1.168 | 4.492 | ZnO | 0.35 | 20 |
| 27 | 0.193 | 0.807 | 1.002 | CeO₂ | 0.260 | MnCO₃ | 1.168 | 4.492 | ZnO | 0.35 | 25 |
| *28 | 0.193 | 0.807 | 1.002 | CeO₂ | 0.260 | MnCO₃ | 1.168 | 4.492 | ZnO | 0.35 | 30 |
| 29 | 0.193 | 0.807 | 1.002 | LaO₃/₂ | 0.275 | MnCO₃ | 1.168 | 4.252 | ZnO | 0.35 | 15 |
| 30 | 0.193 | 0.807 | 1.002 | PrO₁₁/₆ | 0.263 | MnCO₃ | 1.168 | 4.443 | ZnO | 0.35 | 15 |
| 31 | 0.193 | 0.807 | 1.002 | NdO₃/₂ | 0.266 | MnCO₃ | 1.168 | 4.391 | ZnO | 0.35 | 15 |
| 32 | 0.193 | 0.807 | 1.002 | SmO₃/₂ | 0.257 | MnCO₃ | 1.168 | 4.550 | ZnO | 0.35 | 15 |
| 33 | 0.193 | 0.807 | 1.002 | EuO₃/₂ | 0.254 | MnCO₃ | 1.168 | 4.592 | ZnO | 0.35 | 15 |
| 34 | 0.193 | 0.807 | 1.002 | GdO₃/₂ | 0.247 | MnCO₃ | 1.168 | 4.730 | ZnO | 0.35 | 15 |
| 35 | 0.193 | 0.807 | 1.002 | TbO₇/₄ | 0.239 | MnCO₃ | 1.168 | 4.879 | ZnO | 0.35 | 15 |
| 36 | 0.193 | 0.807 | 1.002 | DyO₃/₂ | 0.240 | MnCO₃ | 1.168 | 4.867 | ZnO | 0.35 | 15 |
| 37 | 0.193 | 0.807 | 1.002 | HoO₃/₂ | 0.237 | MnCO₃ | 1.168 | 4.931 | ZnO | 0.35 | 15 |
| 38 | 0.193 | 0.807 | 1.002 | YO₃/₂ | 0.397 | MnCO₃ | 1.168 | 2.947 | ZnO | 0.35 | 15 |
| 39 | 0.193 | 0.807 | 1.002 | CeO₂ | 0.260 | CrO₃/₂ | 1.178 | 4.530 | ZnO | 0.35 | 15 |
| 40 | 0.193 | 0.807 | 1.002 | CeO₂ | 0.260 | MnCO₃ | 1.168 | 4.492 | FeO₃/₂ | 0.35 | 15 |
| 41 | 0.193 | 0.807 | 1.002 | CeO₂ | 0.260 | MnCO₃ | 1.168 | 4.492 | CoO₄/₃ | 0.35 | 15 |
| 42 | 0.193 | 0.807 | 1.002 | CeO₂ | 0.260 | MnCO₃ | 1.168 | 4.492 | NiO | 0.35 | 15 |
| 43 | 0.193 | 0.807 | 1.002 | CeO₂ | 0.260 | MnCO₃ | 1.168 | 4.492 | CuO | 0.35 | 15 |

*indicates the comparative example of the present invention.

Next, polyvinyl alcohol solution: 10 wt % was added with respect to the obtained dielectric ceramic composition powder: 100 wt %, and granulated. Then, after passing through the sieve, the obtained granulated powder was molded by 3 t/cm² pressure to obtain the green molding having the disk form the diameter of 16.5 mm, and the thickness of about 1.2 mm.

Then, the sintered body having the disk form was obtained by firing in air at 1240° C. for 2 hours. Next, Ag electrode was pasted to the main surface of the obtained sintered body, and the baking treatment was further performed in air at 800° C. for 10 minutes to obtain the ceramic capacitor sample having the disk form (sample No. 1 to 43) as shown in FIG. 1. The thickness of the dielectric layer 10 of the obtained capacitor sample was about 1 mm. Then, the specific permittivity, the dielectric loss, the capacitance-temperature characteristic and the insulation resistance were evaluated for each obtained capacitor sample by the following methods.

Specific Permittivity ∈

For the capacitor samples, the specific permittivity ∈ (no unit) was calculated from the capacitance at 25° C. measured by digital LCR meter (4274A by YHP), at a frequency of 1 kHz and input signal level (measured voltage) of 1.0 Vrms. The higher the specific permittivity is, the more preferable it is; and in the present example; 1800 or more was considered good.

Dielectric Loss (Tan δ)

For the capacitor samples, the dielectric loss (tan δ) was measured at 25° C. by digital LCR meter (4274A by YHP), at a frequency of 1 kHz and 100 kHz, and input signal level (measured voltage) of 1.0 Vrms. The lower the dielectric loss is, the more preferable it is; and in the present example, 0.6% or less for the frequency of 1 kHz, and 0.5% or less for the frequency of 100 kHz were considered good.

Capacitance Temperature Characteristic

For the capacitor samples, the capacitance between the temperature range of −25° C. to 140° C. was measured to calculate the changing rate of the capacitance (unit: %) between −25° C. to 125° C. with respect to the capacitance at +25° C. in the present example, the capacitance changing rate within the range of +15% to −30% was considered good. Note that, in Table 2 shown in the following, the capacitance changing rate at −25° C. is shown as ΔC(−25)/C; and the capacitance changing rate at 125° C. is shown as ΔC(125)/C.

Insulation Resistance (IR)

The insulation resistance was measured by applying DC 500V to the capacitor samples. The higher the insulation resistance IR (unit:Ω) is, the more preferable it is; and in the present example, $1 \times 10^4$ MΩ or more was considered good.

According to Table 1 and 2, when the compositions of the dielectric ceramic composition are within the range of the present invention (sample No. 2 to 7, 10 to 12, to 17, 20 to 21a, 24 to 27, 29 to 43), the specific permittivity of 1800 or more, the dielectric loss (1 kHz) of 0.6% or less, the dielectric loss (100 kHz) of 0.5% or less, the insulation resistance of $1 \times 10^4$ MΩ or more, and the capacitance changing rate of +15% to −30% with respect to the capacitance at 25° C. are satisfied with the entire range between −25° C. to 125° C.

That is, by making the compositions of the dielectric ceramic composition within the range of the present invention, the dielectric loss (tan δ) at the wide frequency range was able to be lowered while maintaining a good capacitance temperature characteristic and the specific permittivity, even without including lead (Pb) and bismuth (Bi).

TABLE 2

| Sample No. | Specific permittivity ε | Dielectric loss tan δ (%) [1 kHz] | Dielectric loss tan δ (%) [100 kHz] | Insulation resistance IR (MΩ) | Capacitance temperature characteristic ΔC. (−25)/C. (%) | Capacitance temperature characteristic ΔC. (125)/C. (%) | ε max (%) |
|---|---|---|---|---|---|---|---|
| *1 | 1880 | 0.30 | 0.32 | 1.6E+04 | −10.5 | −5.8 | 24.6 |
| 2 | 1870 | 0.61 | 0.39 | 1.4E+04 | −10.2 | −9.1 | 14.8 |
| 2a | 1910 | 0.58 | 0.37 | 1.4E+04 | −9.9 | −10.3 | 13.5 |
| 3 | 1930 | 0.56 | 0.37 | 1.2E+04 | −10.1 | −12.5 | 11.7 |
| 4 | 2000 | 0.49 | 0.42 | 1.0E+04 | −9.3 | −16.7 | 12.7 |
| 5 | 2120 | 0.48 | 0.40 | 1.5E+04 | −11.0 | −20.3 | 11.9 |
| 6 | 2430 | 0.39 | 0.36 | 3.1E+04 | −12.1 | −24.5 | 10.7 |
| 7 | 2500 | 0.29 | 0.32 | 3.4E+04 | −12.8 | −29.5 | 10.3 |
| *8 | 2280 | 0.21 | 0.22 | 5.1E+04 | −13.3 | −32.5 | 10.1 |
| *9 | 1890 | 0.79 | 0.46 | 1.6E+04 | −8.7 | −18.1 | 12.4 |
| 10 | 1930 | 0.64 | 0.44 | 1.0E+04 | −9.0 | −17.8 | 13.0 |
| 11 | 2090 | 0.44 | 0.43 | 1.2E+04 | −10.1 | −19.0 | 11.8 |
| 12 | 2100 | 0.38 | 0.38 | 1.9E+04 | −10.5 | −17.9 | 12.4 |
| *13 | 2190 | 0.31 | 0.37 | 2.1E+04 | −15.4 | −18.1 | 17.0 |
| *14 | 2290 | 0.30 | 0.47 | 2.3E+04 | −14.8 | −30.7 | 12.2 |
| 15 | 2260 | 0.35 | 0.42 | 2.5E+04 | −15.3 | −27.3 | 11.7 |
| 15a | 2120 | 0.40 | 0.40 | 2.9E+04 | −13.3 | −23.4 | 13.0 |
| 16 | 2030 | 0.52 | 0.33 | 3.2E+04 | −12.1 | −19.9 | 14.3 |
| 16a | 1880 | 0.56 | 0.35 | 2.1E+04 | −12.6 | −18.8 | 14.6 |
| 17 | 1960 | 0.59 | 0.37 | 2.9E+04 | −14.8 | −16.7 | 14.8 |
| *18 | 1920 | 0.78 | 0.31 | 1.8E+04 | −14.6 | −17.2 | 19.1 |
| *19 | 2090 | 0.38 | 0.55 | 1.0E+04 | −5.9 | −15.1 | 11.3 |
| 20 | 2210 | 0.48 | 0.48 | 1.9E+04 | −3.3 | −16.6 | 12.3 |
| 20a | 2100 | 0.50 | 0.44 | 1.5E+04 | −5.8 | −14.8 | 12.3 |
| 21 | 1920 | 0.51 | 0.38 | 1.4E+04 | −8.9 | −13.9 | 12.1 |
| 21a | 1850 | 0.55 | 0.34 | 1.6E+04 | −8.8 | −12.9 | 11.5 |
| *22 | 1770 | 0.56 | 0.32 | 1.2E+04 | −8.1 | −13.3 | 11.6 |
| *23 | 2120 | 0.64 | 0.34 | 1.0E+04 | −12.5 | −8.9 | 16.5 |
| 24 | 2030 | 0.58 | 0.35 | 1.8E+04 | −11.8 | −10.1 | 14.2 |
| 24a | 1950 | 0.55 | 0.37 | 1.6E+04 | −11.3 | −10.0 | 13.9 |
| 25 | 1820 | 0.60 | 0.36 | 1.2E+04 | −10.6 | −10.3 | 12.6 |
| 25a | 2120 | 0.44 | 0.40 | 1.3E+04 | −13.7 | −16.9 | 11.6 |
| 26 | 2260 | 0.36 | 0.44 | 1.5E+04 | −16.9 | −26.1 | 11.3 |
| 27 | 1900 | 0.33 | 0.46 | 1.2E+04 | −18.7 | −24.1 | 10.9 |
| *28 | 1790 | 0.29 | 0.45 | 3.0E+04 | −13.0 | −24.6 | 14.9 |
| 29 | 2030 | 0.47 | 0.37 | 1.5E+04 | −10.1 | −15.5 | 13.0 |
| 30 | 1960 | 0.51 | 0.40 | 1.3E+04 | −9.9 | −17.4 | 12.6 |
| 31 | 1950 | 0.50 | 0.43 | 1.2E+04 | −9.0 | −14.4 | 13.2 |
| 32 | 2000 | 0.53 | 0.41 | 1.1E+04 | −9.2 | −15.9 | 12.4 |
| 33 | 1930 | 0.56 | 0.39 | 1.4E+04 | −9.5 | −17.6 | 12.8 |
| 34 | 1950 | 0.54 | 0.44 | 1.3E+04 | −9.6 | −16.1 | 13.0 |
| 35 | 2010 | 0.59 | 0.45 | 1.3E+04 | −9.6 | −15.8 | 12.9 |
| 36 | 1990 | 0.58 | 0.43 | 1.4E+04 | −9.3 | −15.6 | 12.5 |
| 37 | 1980 | 0.60 | 0.42 | 1.3E+04 | −9.4 | −15.9 | 12.4 |
| 38 | 1960 | 0.53 | 0.42 | 1.1E+04 | −10.0 | −16.2 | 12.5 |
| 39 | 1970 | 0.47 | 0.44 | 1.2E+04 | −10.1 | −17.1 | 12.6 |
| 40 | 1880 | 0.51 | 0.45 | 1.3E+04 | −9.9 | −17.0 | 13.1 |
| 41 | 1920 | 0.5 | 0.43 | 1.1E+04 | −9.5 | −16.8 | 13.7 |
| 42 | 1940 | 0.54 | 0.47 | 1.0E+04 | −9.6 | −16.6 | 13.4 |
| 43 | 1900 | 0.51 | 0.45 | 1.5E+04 | −9.8 | −16.8 | 12.9 |

*indicates the comparative example of the present invention.

On the contrary to this, when the compositions of the dielectric ceramic composition are out of the range of the present invention (sample No. 1, 8, 9, 13, 14, 18, 19, 22, 23, 28), at least one of the specific permittivity, the dielectric loss (1 kHz, 100 kHz), the insulation resistance, the capacitance temperature characteristic were confirmed to be deteriorated.

What is claimed:

1. A dielectric ceramic composition comprising
a main component including a compound satisfying a compositional formula of $(Sr_xBa_{1-x})_mTiO_3$ wherein "x" in said compositional formula is $0.159 \leq$ "x" $\leq 0.238$, and "m" is $0.997 \leq$ "m" $\leq 1.011$, and
a subcomponent comprising $CaTiO_3$, at least one oxide of element selected from a group consisting of Fe, Co, Ni, Cu and Zn, an oxide of element "A" where "A" is at least one element selected from a group consisting of Mn and Cr, and an oxide of element "D" where "D" is at least one element selected from a group consisting of La, Ce, Pr, Nd, Sm, Eu, Gd, Tb, Dy, Ho, and Y; wherein
with respect to 100 weight % of said main component, $CaTiO_3$ is 11 to 25 weight %, and
at least one oxide of element selected from the group consisting of Fe, Co, Ni, Cu, and Zn in terms of $FeO_{3/2}$, $CoO_{4/3}$, NiO, CuO, and ZnO is 0.10 to 0.50 weight %; and
with respect to 100 mol % of said main component,
the oxide of element "A" in terms of Mn element and Cr element is 0.590 to 1.940 mol %, and a ratio (A/D) of the element "A" with respect to element "D" in terms of molar ratio is 2.250 to 7.450.

2. An electronic component comprising a dielectric layer consisting of the dielectric ceramic composition as set forth in claim 1.

3. A power unit comprising the electronic component as set forth in claim 2.

* * * * *